May 2, 1967
I. M. CROLL ETAL
3,317,410
AGITATION SYSTEM FOR ELECTRODEPOSITION OF MAGNETIC ALLOYS
Filed Dec. 18, 1962
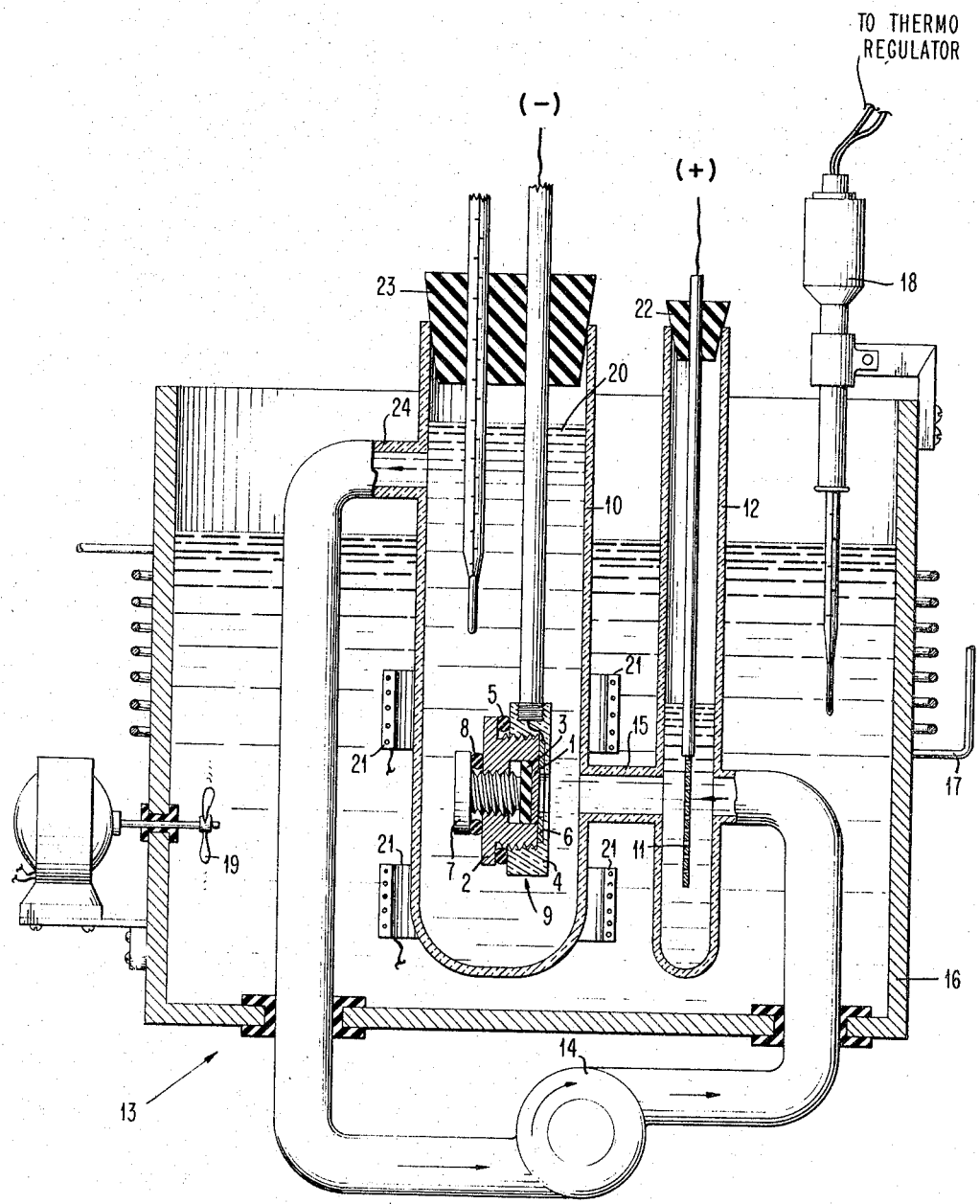
INVENTORS
IAN M. CROLL
RONALD G. STEVENS
BY *Allen A. Meyer Jr.*
ATTORNEY United States Patent Office 3,317,410
Patented May 2, 1967

3,317,410
AGITATION SYSTEM FOR ELECTRODEPOSITION OF MAGNETIC ALLOYS
Ian M. Croll, Pleasantville, and Ronald G. Stevens, Fishkill, N.Y., assignors to International Business Machines Corporation, New York, N.Y., a corporation of New York
Filed Dec. 18, 1962, Ser. No. 245,499
4 Claims. (Cl. 204—23)

This invention relates to an agitation system which allows electrodeposition of films having a uniform thickness and composition.

During electrochemical reduction of an ionic species at a cathode as occurs during the process of electrodeposition, the concentration of the reacting species is diminished as a result of this reduction process. The depletion of the reacting species at the surface of the cathode gives rise to a region of nonuniform concentration extending outward from the surface of the cathode until the concentration of the species is that of the bulk of the solution. The resulting decrease in ionic concentration at the electrode results in the phenomenon known as concentration polarization, concentraiton polarization being defined as the polarization of the electrode due to a change in concentration of the electrolyte from its original value. As a result of this polarization the electrode potential differs from its original equilibrium value. If the concentration change is not uniform over the surface of the film, the distribution of current density and the rate of ion reduction will not be uniform and the resulting deposit will have a nonuniform thickness over its surface area.

If there are two or more species undergoing simultaneous reduction, such as in the case of electrodeposition of alloys, depletion effects will occur in the case of each reacting species. In addition to the concentration polarization effects discussed above, if the reacting species are not depleted at a rate proportional to their concentration in the bulk of the solution, the composition of the electrolyte at the electrode surface will change from that of the bulk of the solution. Since the composition of the deposit is dependent on the composition of the electrolyte at the electrode surface, any variation in the electrolyte composition will result in a variation of the composition of the electrodeposit.

In the case where the electrolyte is not agitated, substantial variations in composition with thickness have been observed. The variation in composition is most pronounced during the deposition of the first 1000 A. of a film. A further discussion of this type of variation can be found in an article entitled, "Variation of Composition with Thickness in Thin Electrodeposited Films of Nickel-Iron Alloys," by G. H. Cockett and E. S. Spencer-Timms, J. Electrochemical Society, vol. 108, No. 9, pp. 906–908. This type of variation is particularly objectionable in the case of electrodeposited Fe-Ni films because of the sensitivity of their magnetic properties to compositional variation. Since the uses envisaged for such films require that their thickness be of the order of 1000 A., the consequences of this compositional variation are greatly magnified.

It would be expected that compositional variation with thickness would be reduced by the agitation of the electrolyte which would act to replenish ions at the electrode. In conventional agitation which consists of moving the electrolyte past the electrode surface, such as is accomplished by rotary stirring, the electrolyte moving past the electrode is progressively depleted of the reacting species as it proceeds from one edge of the surface of the electrode to the other edge. The phenomenon is discussed in "New Instrumental Methods in Electrochemistry" by Paul Delahay, 1954, Interscience Publishers, New York, New York, pp. 231–232. This results in a change in thickness along the direction of the electrolyte flow on the surface of the electrode in the case of reduction of a single ionic species. In the case of two or more depositing species, a compositional variation as well as a thickness variation results.

The present invention describes an agitation system which reduces the ionic depletion effects at the cathode in a uniform manner thus enabling the deposition of films having uniform composition and uniform thickness. This is achieved by directing the flow of electrolyte perpendicularly to the surface of the cathode.

It is an object of the invention to electrodeposit films having a uniform thickness and composition.

Another object of the invention is to provide an agitation system which allows electrodeposition of films having a uniform thickness and composition.

A further object of the invention is to electrodeposit films with the aid of a system of agitation so that there is a decreased tendency for compositional variation with thickness of the deposited film.

Still another object of the invention is to agitate the electrolyte used in electrodepositing films in such a manner that electrolyte flows orthogonally to the cathode and the tendency for ion depletion as the electrolyte is swept across the face of the cathode is removed.

Further, another object of the invention is to perpendicularly flow the electrolyte through a perforated anode to the cathode to thereby deposit by electrolytic action films having a compositional uniformity.

The foregoing and other objects, features and advantages of the invention will be apparent from the following more particular description of a preferred embodiment of the invention, as illustrated in the accompanying drawing.

The sole figure is a schematic diagram of the plating apparatus used in the process of this invention.

The process of this invention consists of electrodepositing a film on a substrate by electrolytic action caused by passing a current through an electrolyte which contains the ions to be reduced plus any other constituents required to enhance the conductivity of the electrolyte or to obtain desired characteristics of the deposit such as smoothness, brightness, and any buffering agents used to maintain the pH of the electrolyte. During electrodeposition, the electrolyte is made to flow in a direction perpendicular to the cathode surface, so that the electrolyte impinges on the electrode orthogonally. The electrolyte is recirculated at high rate by means of a pump (e.g. a flow rate of 3 liters per minute through an inlet aperture of 1 cm. in diameter was found to be sufficient when plating a cathode 1 centimeter in diameter).

In this manner a turbulent flow of the electrolyte is obtained resulting in a high degree of mixing of the solutes of the electrolyte. This high rate of turbulent flow when directed perpendicular to the planar surface of the cathode prevents nonuniform depletion of the solute species being reduced at the cathode.

An anode is provided such that the electrolyte flows past the anode prior to impinging on the cathode surface. Inert anodes such as platinum, stainless steel or carbon can be used or a soluble anode suitable for the material being plated (for example, a Ni anode can be used when plating Ni or Ni-Fe alloys).

The planar cathode must be of a conducting material for example copper, silver, brass or of a non-metallic material such as glass or Mylar which has been coated with a conducting film (e.g. copper, nickel, silver or gold).

The cathode is connected to the negative terminal of a power source while the anode is connected to the positive terminal of the same power source. It is preferred that the electrolyte be maintained at a constant temperature and that the plating current be maintained at a constant current density.

It will be advantageous to use the agitation system of the invention wherever deposits of uniform thickness and composition are desired, particularly in the case of alloy deposition where the alloy constituents plate out in different proportion to their proportional concentration in the electrolyte.

One of the particular uses for which the present invention finds applicability is in the electrodeposition of Ni-Fe thin films. The process and apparatus of the invention will be described in detail in terms of this electrodeposition of Ni-Fe thin films.

The substrate 1 or planar object to be plated in this case is a glass slide which has been metallized by electroless deposition of Ni (or by other suitable means and materials). The substrate 1 is placed in the substrate holder 2 and rests against a substrate support 3. The substrate holder 2 is screwed into the cathode holder 4 until a liquid tight seal is obtained by pressure against O ring 5. The substrate is then brought into contact with the inner conducting surface 6 of the cathode holder 4 by a positioning screw 7 in the substrate holder 2. A liquid tight seal is obtained at the head of the positioning screw 7 by the pressure against O ring 8. The resulting cathode assembly 9 is placed in the cathode compartment 10.

A perforated anode 11 consisting of a woven mesh of Ni-Fe wire having a large surface area is inserted in the anode compartment 12. The function of the woven mesh being to increase the surface area in contact with the flowing electrolyte. Using this configuration a three fold increase in surface area has been obtained over that of a solid electrode of the same overall dimensions. This configuration has been found to be satisfactory in achieving a large effective anode area and in contributing to the turbulence of the flow of electrolyte. However, other electrode configurations may be found to be effective depending upon the plating operation to be performed.

A plating cell 13 is filled with an electrolyte 20 used to plate a Ni-Fe thin film. Stoppers 22 and 23 are provided for the anode and cathode compartment respectively of the plating cell in order to achieve a closed system which will sustain a pumping pressure. The level of the electrolyte is maintained at suitable levels such that the electrodes are totally immersed and the level of the electrolyte in the cathode compartment is above the opening of the outlet pipe 24 which returns the electrolyte to the recirculating pump 14. The desired levels of the electrolyte in the anode and cathode compartments are obtained by suitable adjustment of the amount of gas above the electrolyte in each compartment. This gas can be air, but in the case of an oxidizable species in the electrolyte (such as ferrous ion in the electrodeposition of Ni-Fe films), an inert gas such as nitrogen is used. The electrolyte is thus confined to a closed path and is continuously recirculated. There can be a reservoir in this closed system if a large volume of electrolyte is desired. The electrolyte is circulated by means of pump 14 entering the anode compartment 12, passing through the perforations in the anode 11, and flowing through a passage 15 which connects the anode and cathode compartment. This passage 15 has the same cross-sectional area as the substrate surface area to be plated. The area to be plated and the anode are so aligned facing each other that they are perpendicular to the flow of the electrolyte and are centered along the longitudinal axis of the connecting passage 15 so that the turbulent flow of the electrolyte impinges on the planar substrate orthogonally.

The plating cell 13 is placed in a constant temperature bath 16 which is provided with heating coils 17 and a thermal sensing device 18 which is connected to a thermoregulator. This temperature bath is agitated by stirrer 19. In order to magnetically orient the electrodeposit, the cathode compartment is surrounded by a pair of Helmholtz coils 21 which provide a field whose direction is parallel to the plane of the substrate. Such magnetic orientation is required for Ni-Fe thin films when such films are used as memory storage elements in computer mechanisms.

The following examples more specifically illustrate the present invention.

*Example I*

(A) A Ni-Fe plating bath having the following composition is prepared:

| | g./l. |
|---|---|
| Solution of $NiCl_2 \cdot 6H_2O$ | 200.0 |
| Solution of $FeCl_2 \cdot 4H_2O$ | 0.5 |
| Solution of $H_3BO_3$ | 25.0 |
| Solution of sodium lauryl sulfate | 0.42 |
| Solution of sodium saccharin | 1.0 |

The thus prepared aqueous solution is placed in the plating cell. A substrate consisting of a microscope cover glass slide coated with a thin conducting film of electrolessly deposited nickel is placed in the cathode assembly. This substrate is electroplated under the following operating conditions: pH=3.0.

| | |
|---|---|
| Area plated | 0.78 cm.$^2$. |
| Current | 25 ma./cm.$^2$. |
| Bath temperature | 25° C. |
| Agitation rate | 3 liters/min. |
| Plating time | 25 seconds. |
| Anode | Ni-Fe woven wire mesh. |
| Atmosphere | Nitrogen gas. |

The substrate on which a Ni-Fe thin film has been electroplated is rinsed with distilled water and air dried.

(B) A film was plated from the same electrolyte under the same conditions of temperature, current density, plated area, plating time and on a similar substrate, but with conventional propeller stirring.

Films prepared by the two methods of agitation were analyzed by X-ray fluorescence techniques.

Examination of 1 mm. diameter areas of these films from the leading edge to trailing edge disclosed that the film prepared with conventional agitation in case B had a variation in iron content of 40% from the leading edge to the trailing edge of the plated area in the direction of electrolyte flow. The leading and trailing edges are defined in terms of the direction of electrolyte flow with the leading edge being the edge which the electrolyte first passes in its direction of flow.

The iron content of the trailing edge is 40% less than the iron content of the leading edge. The nickel content was reduced by 17% from the leading edge to the trailing edge.

A similar analysis of the thin film plated with the method of the invention (case A) showed no significant variation in Fe and Ni content from the leading edge to the trailing edge of the plated area.

The average relative Fe content of the leading half of the plated film and of the trailing half were determined for both cases A and B by X-ray fluorescent analysis.

| | Leading half | Trailing half |
|---|---|---|
| Counts per second of Fe radiation: | | |
| A | 230 | 214 |
| B | 240 | 240 |

Example II

The process of Example I was repeated except that the following electrolyte and operating conditions were used: pH=3.0.

|  | g./l. |
|---|---|
| Solution of NiCl$_2$·6H$_2$O | 200 |
| Solution of FeCl$_2$·4H$_2$O | 3.5 |
| Solution of H$_3$BO$_3$ | 25.0 |
| Solution of sodium lauryl sulfate | 0.42 |
| Solution of sodium saccharin | 1.0 |
| Area plated | 0.78 cm.$^2$. |
| Current density | 20 ma./cm.$^2$. |
| Bath Temperature | 65° C. |
| Agitation rate | 3 liters/min. |
| Plating time | 30 seconds. |
| Anode | Ni-Fe woven wire mesh. |
| Atmosphere | Air. |

Case A—Ni-Fe films plated by the method of this invention showed no significant variation in composition over the plated area.

Case B—Ni-Fe films plated with conventional propeller stirring showed a compositional variation of 15% from the leading edge to the trailing edge of the plated area.

Example III

The process of Example I was repeated except that the following electrolyte and operating conditions were used: pH=4.5

|  | g./l. |
|---|---|
| Solution of NiCl$_2$·6H$_2$O | 118.0 |
| Solution of CoSO$_4$·7H$_2$O | 140.0 |
| Solution of H$_3$BO$_3$ | 30.0 |
| Solution of sodium saccharin | 2.0 |
| Area plated | 0.78 cm.$^2$. |
| Current | 40 ma./cm.$^2$. |
| Bath temperature | 65° C. |
| Agitation rate | 3 liters/minute. |
| Plating time | 18 minutes. |
| Anode | Co-Ni woven wire mesh. |
| Atmosphere | Air. |

Case A—Co-Ni films plated by the method of this invention exhibited a uniform composition over the plated area.

Case B—Co-Ni films plated with conventional propeller stirring exhibited an 18% decrease in Co content and a 10% decrease in Ni content from the leading edge to the trailing edges of the plated area.

Example IV

The process of Example I was repeated except that the following electrolyte and operating conditions were used:

|  | g./l. |
|---|---|
| Solution of Pb(BF$_4$)$_2$ | 381.0 |
| Solution of Sn(BF$_4$)$_2$ | 30.0 |
| Solution of HBF$_4$ | 45.0 |
| Solution of glue | 0.5 |
| Area plated | 0.78 cm.$^2$. |
| Current density | 40 ma./cm.$^2$. |
| Bath temperature | 25° C. |
| Agitation rate | 3 liters/minute. |
| Plating time | 5 minutes |
| Anode | Sn and Pb wires interwoven to form a mesh. |
| Atmosphere | Air. |

Case A—SnPb films plated by the method of the invention exhibited a uniform composition over the plated area.

Case B—SnPb films plated with conventional propeller stirring exhibited a 13% decrease in Sn content and an 8% decrease in Pb content from the leading edge to the trailing edge of the plated area.

The method described herein involves the planar substrate to be plated and the perforated anode facing each other so that both are perpendicular to the turbulent flow of the electrolyte thus impinging the electrolyte on the planar substrate orthogonally. Thus, there has been set forth a method which reduces the ionic depletion effects at the cathode of a plating cell in such a manner the electrodeposited films exhibit a uniform composition and a uniform thickness.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for electrodepositing a thin magnetic alloy film of the order of 1,000 A. so that the composition of the latter is uniform throughout the film thickness comprising:
    (a) providing a substrate onto which the film is to be deposited,
    (b) providing an electrolyte which will deposit said alloy film onto said substrate,
    (c) providing a stream of said electrolyte to orthogonally impinge upon said substrate,
    (d) agitating said stream during said orthogonal impingement, and
    (e) subjecting said flowing electrolyte to electrolytic action to thereby deposit a thin magnetic alloy film of the order of 1,000 A. onto said substrate.

2. The method of claim 1 wherein said electrolyte streams orthogonally to said substrate at a rate of at least 3 liters/min.-cm.$^2$.

3. The process of claim 1 wherein the thin film deposited is a nickel iron film.

4. The process of claim 1 wherein the deposited film is a cobalt-nickel.

References Cited by the Examiner

FOREIGN PATENTS

| 986 | 1896 | Great Britain. |
|---|---|---|
| 860,299 | 12/1952 | German. |
| 888,192 | 8/1953 | German. |

OTHER REFERENCES

S. Glasstone and J. C. Speakman: Journal of Electroplaters' and Depositors' Tech. Soc., vol. 6, pp. 49–57 (1930).

JOHN H. MACK, *Primary Examiner.*

T. TUFARIELLO, *Assistant Examiner.*